May 10, 1927.
W. S. SHERMAN
1,628,335
FLOORING END MATCHER
Filed May 12, 1921    6 Sheets-Sheet 6
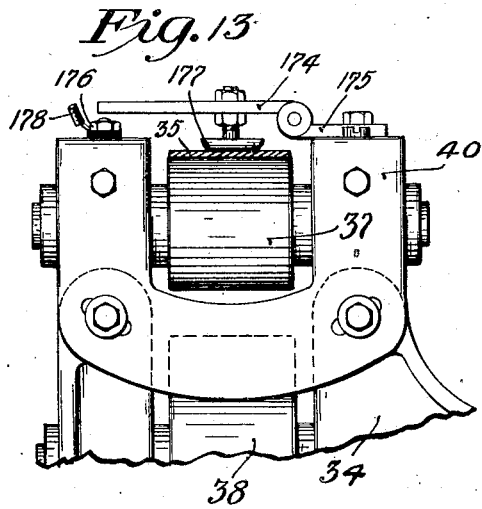
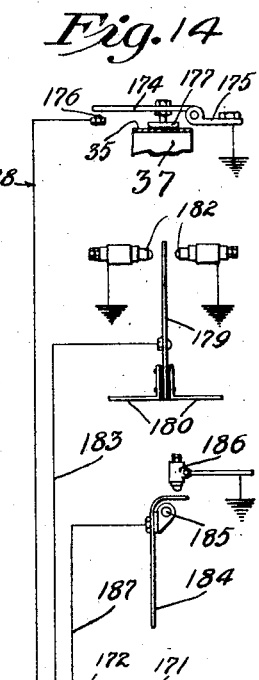
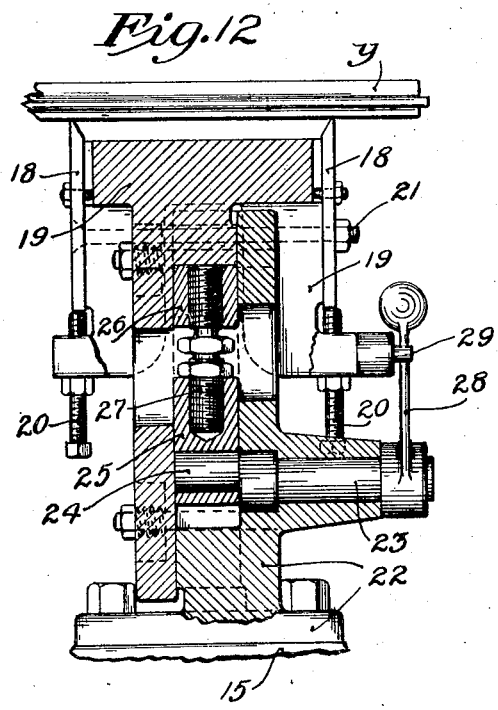
Inventor
W. S. Sherman
By his Attorneys Patented May 10, 1927.

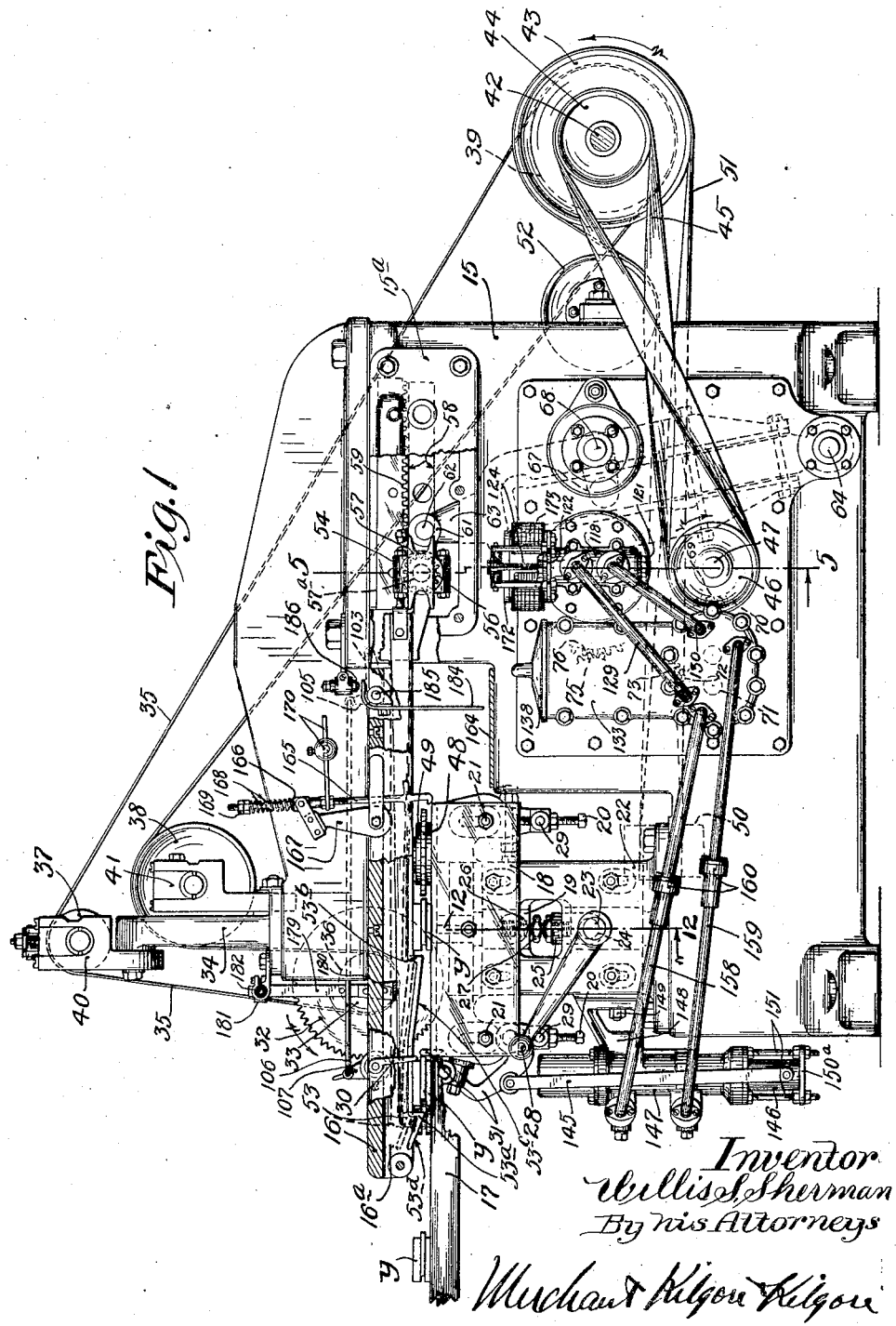

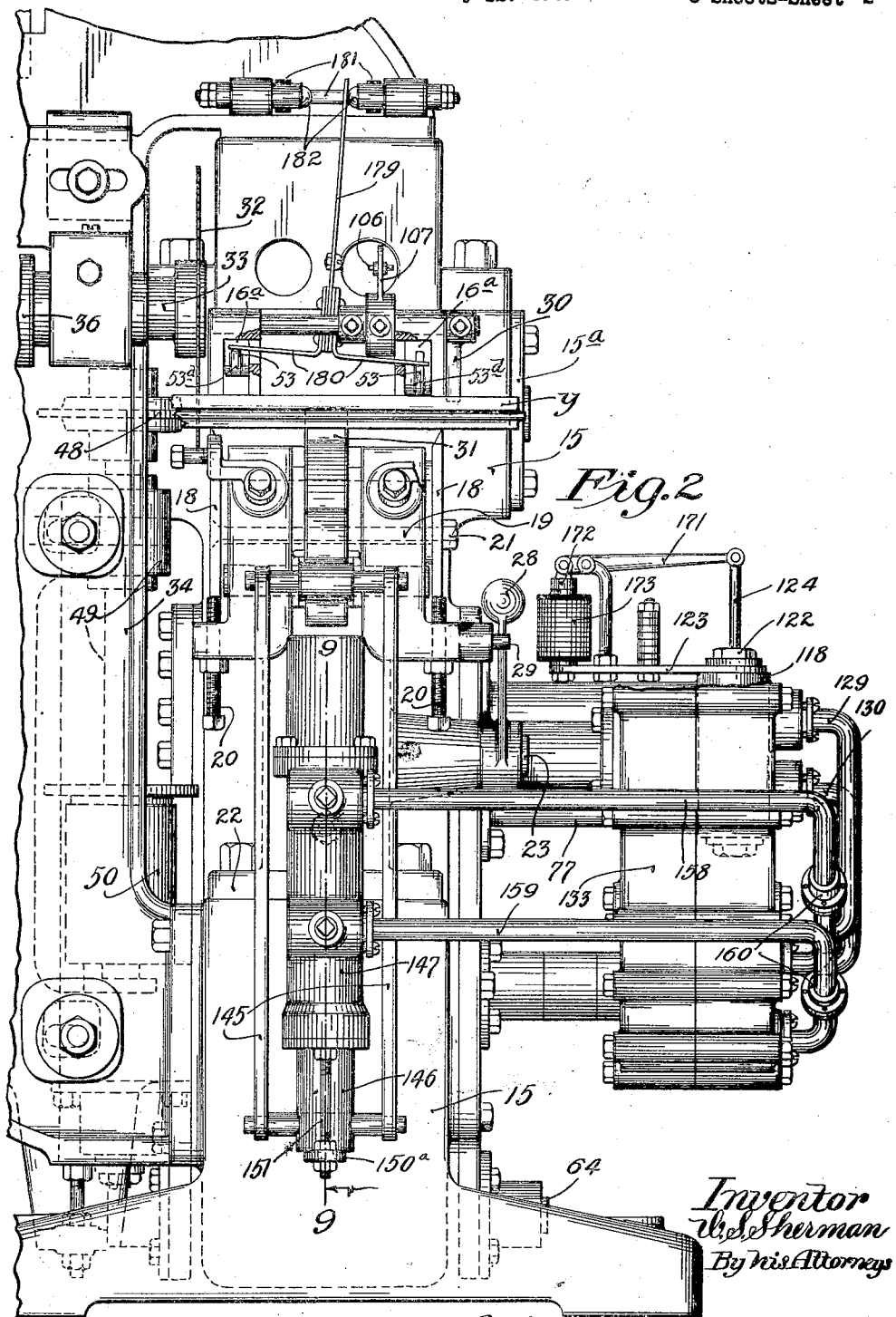

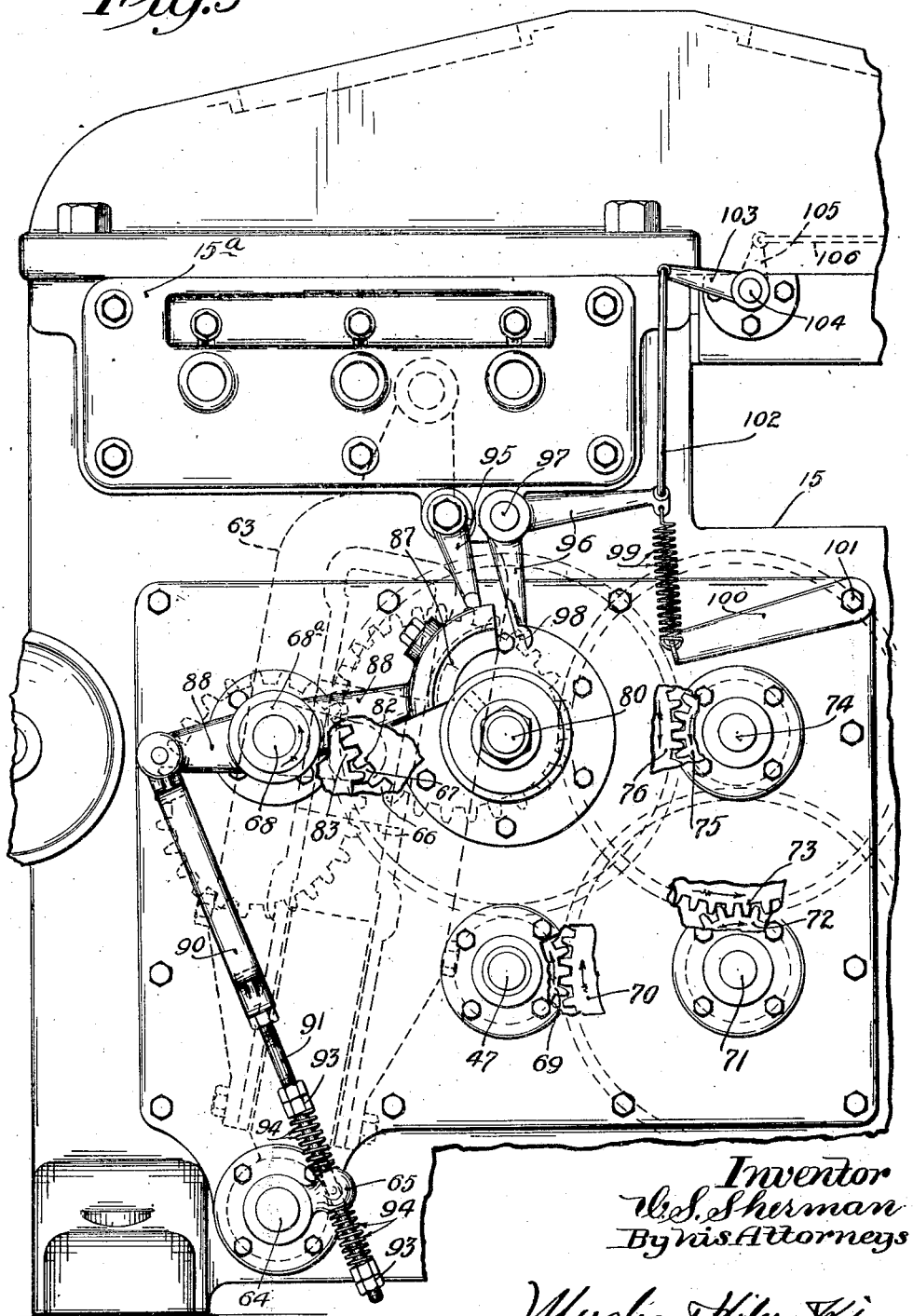

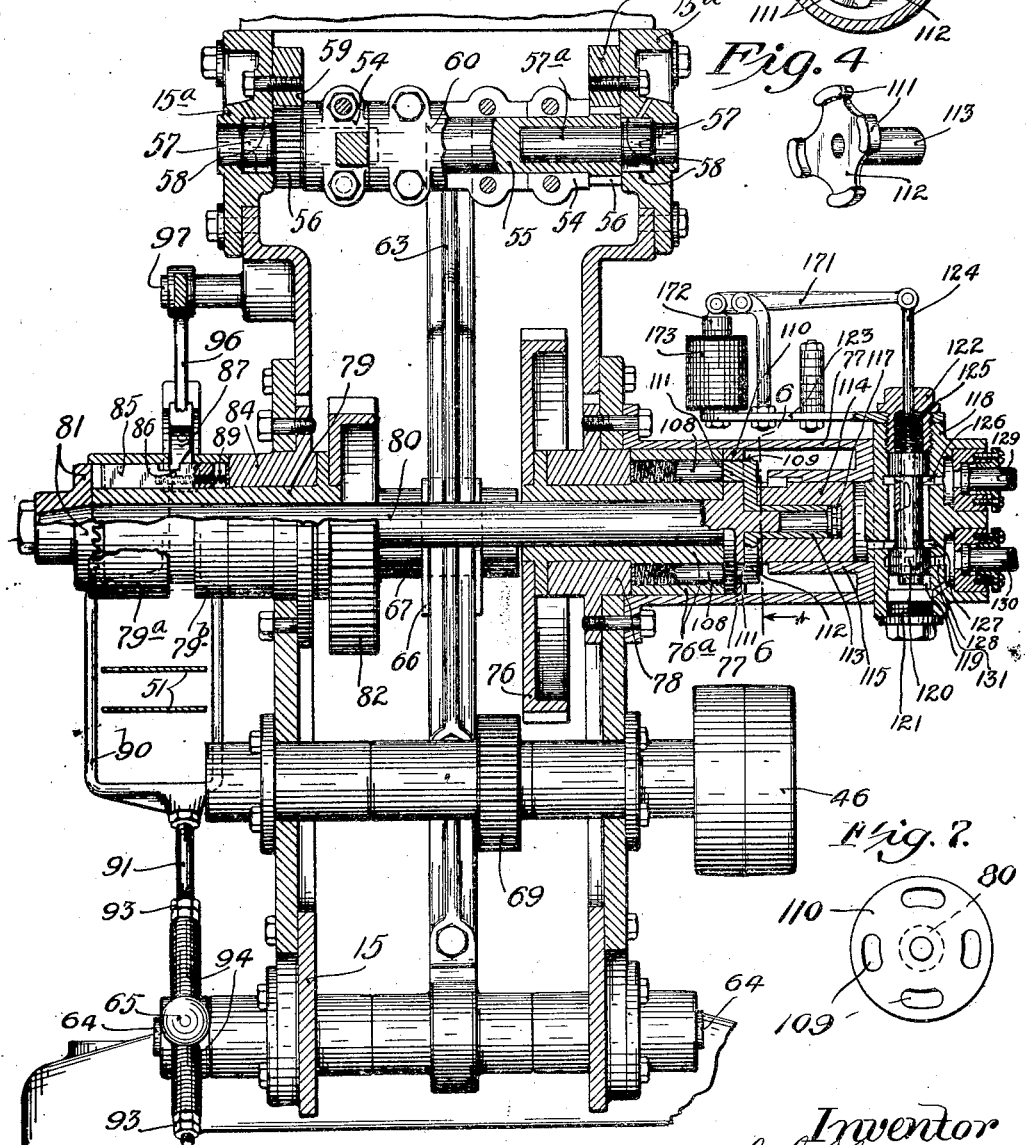

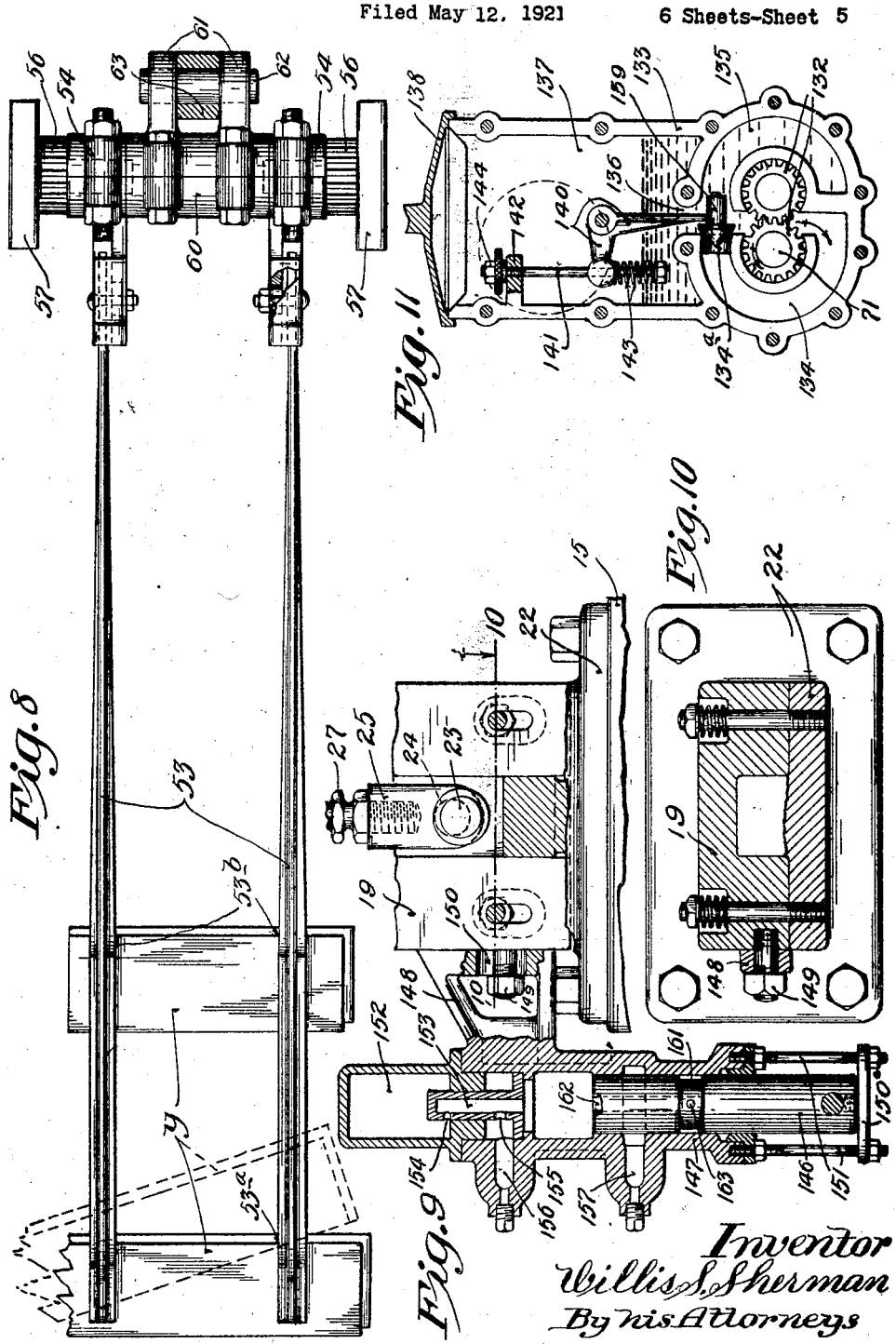

1,628,335

UNITED STATES PATENT OFFICE.

WILLIS S. SHERMAN, OF MINNEAPOLIS, MINNESOTA.

FLOORING-END MATCHER.

Application filed May 12, 1921. Serial No. 468,820.

My present invention relates to what is known as end matchers and, generally stated, has for its object to improve the construction and operation thereof.

The well known purpose of machines of the above type is to cut grooves in or tongues on the ends of matched flooring. In practice, it has been found that the cutting of these grooves and tongues in the ends of match flooring is a much more difficult operation than the cutting of such grooves and tongues on the longitudinal edges thereof, and that a machine, to successfully perform the purposes of this invention, must perform many functions and meet many conditions. For instance, the flooring must first be accurately squared up to the line of feed to and past the cut-off saw and end groover or cutter. Next, it is of the utmost importance that, throughout said feed movements, the flooring be kept in its squared-up position and securely held against endwise drifting movements. Then, when the groove or tongue has been properly cut in the end of the flooring, it should be properly held and dropped onto an endless discharge belt or conveyor without breaking of any of the delicate edges of the flooring.

For properly guiding and directing the flooring to the saw and cutter, I provide a head block or plate and, substantially parallel therewith, co-operating parallel underlying knife-edged guide rails, which head block and guide rails constitute the feed passage to said saw and end cutter.

The flooring is preferably first placed by hand on a feed table and by hand directed against a so-called starting trigger, which, by such contact, automatically trips the machine into action and causes the flooring thus pressed to be engaged by co-operating rake-acting feed bars having primary and secondary hooks arranged to square up the flooring by forcing the same against a yielding feed-resisting device. This feed-resisting device is a hydraulic device of novel construction that receives its hydraulic pressure from a hydraulic pump preferably of the rotary type. The hydraulic feed-resisting device is arranged to offer maximum resistance against the initial impact or pressure and then to gradually break down or give away under continued pressure and movement of the flooring under the action of the feed bars.

In addition to the features above generally indicated, the invention includes automatic tripping devices, preferably of electromagnetic character, which will automatically stop the feed mechanism of the machine when anything goes wrong with the driving mechanism or in the manner of pressing the flooring to the saw and end cutter or in the delivery of the finished flooring.

A commercial form of the machine is illustrated in the accompanying drawings, wherein like characters indicate like parts throughout the several views.

Referring to the drawings:

Fig. 1 is a side elevation of the complete machine, some parts being sectioned;

Fig. 2 is a front end elevation of the machine with some parts broken away and with the parts shown on a larger scale than in Fig. 1;

Fig. 3 is a left-side elevation of a portion of the machine, some parts being broken away;

Fig. 4 is a perspective showing the head of the secondary clutch;

Fig. 5 is an enlarged view chiefly in section on the line 5—5 of Fig. 1, with some parts in full;

Fig. 6 is a detail in section approximately on the line 6—6 of Fig. 5, some parts being broken away;

Fig. 7 is an elevation showing the clutch-operating end of the driving counter-shaft;

Fig. 8 is a plan view showing the feed bars and certain of the operating connections therefor;

Fig. 9 is a vertical section taken approximately on the line 9—9 of Fig. 2, some parts being broken away and some being in full;

Fig. 10 is a horizontal section approximately on the line 10—10 of Fig. 9;

Fig. 11 is an elevation of the rotary hydraulic pump with the face plate thereof removed and some parts being in section;

Fig. 12 is a section taken approximately on the line 12—12 of Fig. 1;

Fig. 13 is a detail in elevation showing one of the guide pulleys for the discharge belt or conveyor; and Fig. 14 is a diagrammatic view illustrating the wiring of the several electromagnetic safety devices applied to the machine.

The framework 15 of the machine is a heavy cast structure, which supports the various parts of the mechanism, as will hereinafter appear, and which, it may be now noted, rigidly supports, near its upper portion and at its receiving end, a horizontal so-called head block or overhead guide plate 16, the under-surface of which is flat and smooth except for two parallel longitudinal channels 16ª and for certain minor perforations to be hereinafter noted.

The bifurcated receiving end of this head block 16 overlies the delivery end of a suitably supported feed table 17 that directs the flooring strips y to the suitably formed ends of knife-edged guide rails or plates 18. The sharp upper edges of these guide rails 18 are parallel to each other and to the substantially under-surface of the head block 16 and are rigidly supported and so spaced from said head block that when the flooring strips are forced under said head block and over the sharp edges of said guide rails, the latter will cut slight creases in the under-surface of said strips, (see Fig. 12). These guide rails 18 are rigidly but adjustably secured to a table block 19 by means of set screws 20 and a nut-equipped bolt 21. Said table block 19 is mounted for true vertical sliding movements on a pedestal bracket 22 rigidly secured to the main frame.

The numeral 23 indicates a short crank shaft mounted for rocking movements in the pedestal bracket 22 and having a wrist pin 24, on which is journaled the lower section 25 of a short thrust rod made up of said section 25, a bearing head 26 and a double-ended screw 27, which latter has reversely threaded engagement with said elements 25 and 26. The head 26 is seated for rocking movement against an underlying portion of the table block 19. At its outer end, the crank shaft 23 has a lever 28, which, when in the position shown in Fig. 1, causes the crank shaft 23 to lift the table block 19 and guide rails 18 to their uppermost operative positions, but which, when turned to the opposite side, drops the same down so that flooring strips may be readily removed out of the feed passage formed between the rails 18 and overlying head block 16. The screw 27 affords means for adjusting the table block 19 so as to set the guide rails 18 in respect to the head block 16 for action on flooring strips varying in thickness, say, from three-eighths of an inch to one and one-eighth inches. Extreme oscillatory movements of the lever 28 are limited by stops 29 on projecting arms of the table block 19, (see Figs. 1 and 12).

When the flooring strip y is in a position just about to be delivered to the receiving ends of the sharp edges of guide rails 18, its front edge is forced first against the depending end of a trigger arm 30 and, a little later, against the finger or upwardly projecting end of a feed-resisting arm 31. The trigger arm 30 forms a part, or rather the trigger element, of automatic mechanism for throwing the main or driving clutch of the machine into action, and the feed-resisting arm 31 forms a part of the automatic hydraulic feed-resisting device, both of which devices have been hitherto briefly referred to and will be further described later on.

For cutting off the rough ends of the flooring strips, there is provided the customary circle saw 32 carried by a spindle 33 journaled in a suitable bearing on a heavy upright bearing bracket 34 rigidly supported by the machine frame, (see particularly Figs. 1 and 2). This saw 32 is driven through a belt 35 that runs over a pulley 36 on the spindle 33 and over pulleys 37, 38 and 39. The pulleys 37 and 38 are journaled, respectively, to bearings 40 and 41 supported by the bearing bracket 34; while the pulley 39 is carried by a power-driven driving shaft 42 journaled in suitable fixed bearings, not shown, and carrying also two other pulleys 43 and 44.

A belt 45 runs over the pulley 44 and over a driving pulley 46 carried by one end of a main countershaft 47 journaled in the main frame.

In the machine illustrated, the end-cutting tool is in the form of a small circle saw 48 carried by an upright spindle 49 journaled in suitable bearings on the bearing bracket 34 and, near its lower end, having a pulley 50. This groove-cutting tool is driven through a belt 51 that runs over the pulley 43 of the driving shaft 42 and over the pulley 50 on the spindle 49, (see Fig. 2). The belt 51 also runs under a guide wheel 52 journaled to a suitable bearing on the main frame, (see Fig. 1).

The two rake-acting feed bars 53, (see particularly Figs. 1, 2 and 8), are arranged to work freely in the grooves 16ª of the head block 16 and they are formed with so-called primary and secondary driving hooks or lugs 53ª and 53ᵇ and, between said lugs, with oblique lower surfaces 53ᶜ and, at their extreme free ends, with beveled surfaces 53ᵈ.

At their rear ends, the feed bars 53 have bearing heads 54, (see Figs. 1, 5 and 8), in which is journaled a spindle 55 provided at its ends with small spur pinions 56. The numeral 57 indicates elongated bearing shoes shown as provided with pin-like projections 57ª journaled in the ends of the spindle 55. These shoes 57 slide horizontally in guideways 58 formed in plates 15ª secured to the sides of the frame 15, and the pinions 56 engage with racks 59 rigidly secured to the plates 15ª at the sides and above said guideways, as best shown in Figs. 1 and 5. Journaled on the central portion of the spindle 55 is a sleeve 60 having lugs 61, which, by a pin 62, are pivotally connected to the extreme upper end of a long rocker arm 63, (see Figs. 1, 3 and 5), which rocker arm, at its lower end, is secured to a rock shaft 64 journaled in bearings on the main frame and provided at one end with a short clutch-actuating arm 65, the function of which latter will presently be noted.

This rocker arm 63 is formed with a long slot or guideway in which works a sliding block 66 that is journaled on the crank 67 of a shaft 68.

The main countershaft 47 carries a spur pinion 69 that meshes with a spur gear 70 carried by the shaft 71 journaled to the main frame and provided with a spur pinion 72. The pinion 72 meshes with a spur gear 73 carried by a shaft 74 journaled to the main frame and provided with a spur pinion 75. The spur pinion 75 meshes with a spur gear 76, the sleeve-like hub 76ª of which is journaled in a tubular housing 77 secured on the main frame and projecting horizontally therefrom, as best shown in Fig. 5. To hold said gear 76 against axial movements, its sleeve-like hub 76ª is formed with an annular channel in which is seated a bearing box or collar 78 that is rigidly secured to the main frame.

Rotatably journaled in the hub 76ª and in a sleeve 79 that is axially aligned therewith and journaled in the opposite side of the main frame, is a countershaft 80, to the outer end of which is rigidly secured a notched clutch hub or element 81, (see Fig. 5).

To the inner end of the rotary sleeve 79 is secured an elliptical gear 82 that meshes with an elliptical gear 83 that is secured to the crank shaft 68, which crank shaft, it will be remembered, has a crank that operates the rocker arm 63. The rotary sleeve 79 has an annular groove in which is seated a bearing sleeve 84 that is rigidly secured to the side plates of the main frame by machine screws or otherwise. Here it may be stated that the two bearing collars 78 and 84 are preferably diagrammatically split structures adapting them to be readily applied in the seats formed therefor, respectively, in the bearing sleeves 76ª and 79. The numeral 85 indicates a clutch dog that co-operates with the teeth of the clutch member 81 and is arranged to slide like a key in a longitudinal groove formed in the rotary sleeve 79. This sliding dog 85 has a cam shoulder 86 that is adapted to be engaged by the beveled segmental edge of a clutch-releasing head 87 carried by one end of a lever 88 that is intermediately pivoted on a fixed bearing sleeve 68ª, in which one end of the shaft 68 is journaled.

The beveled segmental edge of the clutch-releasing head 87 is adapted to engage the shoulder 86 of the clutch dog 85 through an annular channel formed between rings 79ª and 79ᵇ that are shrunk onto the outer portion of the sleeve 79 and are spaced axially thereof. The clutch dog 85 is yieldingly forced into engagement with the teeth of the clutch member 81 by a light coiled spring 89, (see Fig. 5).

The outer end of the lever 88 is pivoted to the upper end of a fork 90 to which a rod 91 is adjustably secured by nut and threaded engagement. The member 90 is made of yoke form so that it will clear the belt 51. The lower end of the rod 91 works freely through the perforated end of the clutch-operating arm 65, (see Figs. 3 and 5), that is secured to one end of the rocker arm shaft 64. Surrounding the rod 91, one above and one below the arm 65, and compressed between said arm and nuts 93 on said rod, are coiled springs 94. These springs have a peculiar action, which will be hereinafter described.

The numeral 95 indicates a stop arm rigidly secured to the framework of the machine and serving to limit the upward movement of the clutch-releasing head 87. The numeral 96 indicates a bell crank pivoted on a stud 97 projected from the framework. The lower arm of this bell crank has an offset shoulder 98 that is adapted to engage the free end of the clutch-releasing head 87 and hold the same pressed down in its clutch-releasing position at certain times hereinafter noted. A coiled spring 99, attached to the upper arm of the bell crank 96 and to an anchoring arm 100, tends to force the bell crank into its operative position. The anchoring arm 100, as shown, is rigidly but adjustably secured to the framework by a machine screw 101, (see Fig. 1). The upper arm of the bell crank 96 is connected by a rod 102 to an arm 103 secured to a rock shaft 104 suitably mounted on the framework and provided with an upstanding arm 105, which, by a rod 106, (see Figs. 1 and 3), is connected to a short arm 107, which, in turn, is connected to and oscillates with the trigger arm 30 heretofore described. Said elements 30, 107, 106, 105, 104, 103, 102 and 96 constitute an automatic tripping mechanism in which said element 30 is the trigger and the element 96 is the lock for the main or primary driving clutch 81—85. The manner in which this main clutch is operated will appear in the description of the operation to be given later on.

For connecting the driving sleeve 76ª to the shaft 80, I provide a so-called secondary driving clutch, the preferred construction of which is illustrated in Figs. 4, 5 and 6, and which includes spring-pressed plunger-like clutch dogs 108 mounted in the large end of the sleeve 76ª and adapted to engage seats 109 formed in an outstanding annular flange 110 of the shaft 80. Arranged to work also in the seats 109 are dog-displacing lugs 111 secured to a disk 112. The disk 112 rotates with the shaft 80 and is provided with a tubular stem 113, which, as shown, is slidably mounted on a reduced end of said shaft 80 and is rotatively mounted in a non-rotary piston head 114. The piston head 114 is slidably mounted in a cylinder 115, which, as shown, is formed as a part of the cylindrical casing 77 bolted to the framework of the machine. Preferably, a thrust-acting ball-bearing 117 is placed between the end of the tubular spindle 113 and the piston head 114.

Bolted or otherwise rigidly secured to the outer end of the casing 77 is a valve housing 118 formed with a vertical cylindrical valve seat 119, in which works a cylindrical slide valve 120. The lower end of the valve seat 119 is closed by a plug 121 and the upper end thereof is closed by a plug 122, which latter, as shown, anchors in position a supporting arm 123. The central portion of the valve 120 is reduced in diameter and said valve has an upwardly projecting stem 124 that works through the plug 122. A coiled spring 125, seated in the plug 122, yieldingly presses the valve 120 downward.

The valve 120 co-operates with ports 126, 127 and 128 in the valve housing 118. The port 126 is connected to the delivery end of a pressure pipe 129, the port 127 opens into the cylinder 115, and the port 128 is connected to a discharge pipe 130. The numeral 131 indicates a port that always connects the discharge pipe 130 with the lower portion of the piston seat 119, and through an axial passage in the valve, with the upper end of said cylinder.

The pipes 129 and 130 lead, respectively, from and to a rotary hydraulic pump, best shown in Figs. 1, 2 and 11. This pump, as shown, comprises intermeshing gears 132, one of which is secured to the extended end of the shaft 71. This hydraulic pump operates on a well known plan and the gears 132 are mounted in a casing 133 that is formed with a pressure chamber 134 and a suction or receiving chamber 135, which latter, through a port 136, is in constant communication with an oil supply chamber 137 formed in the pump casing 133. The chamber 137 is shown as provided with a cover 138, which need not be and preferably is not air-tight. The casing 133, as shown, is made in two parts.

The pressure chamber 134 of the pump is adapted to deliver surplus oil back into the oil supply chamber 137, through a port 134ª that is normally closed by a valve 139 that acts as a yielding abutment or resistant against such delivery of oil. This valve 139, as shown, is carried by the lower arm of a bell crank 140 that is pivotally mounted within the oil chamber 137. The numeral 141 indicates an adjusting rod that is passed freely through the short arm of the bell crank 140, and through a lug 142 on the interior of the casing 133. A coiled spring 143 is interposed between the head of the upper arm of the bell crank 140 and the head of the lower end of the adjusting rod 141. The threaded upper end of the rod 141 is provided with a tension adjusting nut 144.

It may now be noted that the pressure pipe 129 leads from the pressure chamber 134 of the pump and that the discharge or return pipe 130 leads to the suction chamber 135 of said pump.

The automatic hydraulic feed-resisting device, of which the arm 31 forms a part, will now be described. Attention will now be directed particularly to Figs. 1, 2 and 9.

By means of laterally spaced links 145, the arm 31 is connected to the lower end of a piston 146 that works in a cylinder 147. This cylinder 147, as shown, is cast integral with a bracket 148, which, by a nut-equipped stud 149 and a slot 150, is rigidly connected to the vertically adjustable table block 19, to which, it will be remembered, the knife-edged bars or rails 18 are secured. The extreme downward movement of the piston 146 is limited by a stop plate 150ª adjustably secured to the lower end of the cylinder 147 by nut-equipped bolts 151. Attached to the upper end of the cylinder is an air chamber 152 that is in constant communication with the upper end of said cylinder through an axial tube 153 shown as formed with ports 154 and 155. Said cylinder is provided with laterally offset intake and discharge ports 156 and 157, respectively.

A pressure pipe 158 leads from the pressure chamber 134 of the pump to said port 156, and a return pipe 159 leads from said discharge port 157 to the suction or receiving chamber 135 of said pump. Said pipes 158 and 159 are provided at their intermediate portions with flexible couplings 160, which permit vertical adjustments of the cylinder 147 and rails 18.

The piston 146 is formed with an annular groove or port 161 that is in constant communication with the upper end of the cylinder through an axial passage 162 and radial passages 163, see Fig. 9. The action of this device will be given in the description of the operation.

Just after the groove or tongue has been cut in the end of the flooring strip, it is engaged by a so-called supporting hook, the function of which is to prevent the strip from tending to drop before it is clear of the knife edges (see Fig. 1). This supporting hook is in the form of a rod 165, the lower end of which is in the form of a hook, for the purposes indicated. This rod slides through a bearing 166 pivoted to a bracket 167 adjustably fixed to the head block 16. A coiled spring 168, on said rod, compressed between the bearing 166 and nuts 169 on said rod, yieldingly holds the hook in its raised position shown in Fig. 1, while a weighted arm 170 yieldingly holds the hooked end of said rod in the receiving position shown in Fig. 1.

For throwing the feed mechanism of the machine automatically out of action, when certain things happen or go wrong with the machine or with the manner of delivery of the flooring strips, I provide certain electro-magnetic tripping devices which may be applied in various different places, but which, in the machine illustrated, are applied and operated as follows: The stem 124 of the controller valve 120 is pivoted to one end of a lever 171, (see Fig. 5), the short end of said lever being provided with an armature 172 that is subject to an electromagnet 173 anchored to the bearing arm 123. Here it may be stated that in Fig. 5, the electromagnet 173 is assumed to be energized and, hence, operative to raise the valve 120, as there shown.

Attention is now also particularly called to the diagram view, Fig. 14, wherein the electromagnet 173 is shown as arranged to be energized through circuits controlled by three different safety devices. The safety device shown at the top in Fig. 14, but also shown in Figs. 1 and 13, comprises a gravity-held circuit-closing lever 174 pivoted to a grounded lug 175 and engageable with an insulated contact 176. The lever 174 has a shoe 177 that normally rides on the belt 35, but which, should said belt break, will drop and allow the contact lever 174 to engage the contact 176 and then close the circuit to the magnet 173 through a lead wire 178.

The tripping device shown next to the top in Fig. 14 and also in Figs. 1 and 2, comprises a wabbling contact arm 179 that, at its lower end, has oppositely projecting fingers 180 insulated from said lever. These fingers 180 ride on the smooth upper edges of the feed hooks 53, (see Figs. 1 and 2,) and the upper end of the arm 179 works between insulated guides 181 and is thereby held against oscillatory movements longitudinally of the machine but free for vibratory movements transversely of the machine. When both of the feed hooks or bars 53 are of the same altitude, the contact arm 179 will remain out of contact with two grounded contacts 182, but when either one of the hooks is moved higher than the other, as will be the case if a flooring strip should get into the oblique position shown by dotted lines in Fig. 8, then said contact arm 179 will engage one or the other of said grounded contacts 182 and will then cause the electromagnet 173 to be energized through a lead wire 183.

If the finished flooring strips should, for any reason, accumulate on the discharge belt 164, as would be the case if said belt should stop running, then the tripping device shown just above the electromagnet 173, in Fig. 14 and also shown in Fig. 1, will come into action. This tripping device comprises a gravity-suspended tripping contact arm 184 pivoted to the head block 16 at 185 and adapted, when its depending portion is moved rearward, to engage a fixed grounded contact 186 and then cause the electromagnet 173 to be energized through a lead wire 187.

Operation.

The operation of the machine above described, somewhat briefly summarized, is as follows:

As before stated, the flooring strips $y$ are on the feed table substantially at a right angle to the line of feed and are pressed into contact with the trigger 30, as shown in Fig. 1. Attention is here called to the fact that, normally, the beveled segmental edge of the clutch-releasing head of the lever 88 will be pressed down and held by the shoulder 98 of the bell crank 96; and the rocker arm 63 will be in its position shown in Fig. 3, thereby throwing the arm 65 downward and compressing the lower spring 94. Said lower spring 94 will, therefore, at this time be put under tension to throw the clutch-releasing head 97 back to its clutch-releasing position shown in Fig. 3 whenever the bell crank 96 is moved into its releasing position shown in Fig. 3; and now it will be observed that, when the flooring strip is forced against the trigger 30, said bell crank 96 will be moved into such clutch-releasing position. Instantly upon release of the lever 88, the lower spring 94 therefore acts to retract the head 97 and permit the spring 89, (see Fig. 5), to engage the clutch dog 85 with the clutch hub 81, and this immediately throws into action the rake-acting feed bars 53. Here, attention is called to the fact that, under all normal conditions, the dogs or plungers 108 are in engagement with the clutch flange 110 of the shaft 80, or, otherwise stated, the secondary clutch, including the clutch elements 108 and 110, is normally active to transmit motion, so that as soon as the primary clutch 81—85 is thrown into action, the hook-equipped feed bars 53 and the oscillatory arm 63 will be thrown into action.

Under their first movement, the hooks 53$^a$ of the two feed bars will simultaneously engage the first presented flooring strip $y$ and, by forcing the same against the upper end of the feed-resisting arm 31, will positively position such strip at a right angle to the line of feed. Under initial forward movement, the flooring strip will be forced against the upper end of the resisting arm 31 and, immediately thereafter, will be forced up the beveled end and onto the top knife edges of the guide rails 18. These knife edges are preferably set at a very slight conversion toward the under surface of the head block 16 so that, as the flooring strips are forced over said knife edges, the latter will cut slight grooves in the bottom surface of the flooring strip and will press the upper surface of said strip tightly against the head block. Thus, throughout their movements through the feed passage formed between the head plate and knife-edged guide rails, the flooring strips will be squared up to the line of feed movement and against endwise drifting movement. The cam surfaces 53$^d$ cause the feed bars 53 to cam themselves into feeding engagement with the strip that is in its first position at the left, and the cam surfaces 53$^e$ cause said bars to cam themselves into feeding engagement with the strip that is in its second position further at the right, in Fig. 1. This is considered an important novel feature.

As the flooring strip is fed over the upper end of the resisting arm 31, said arm will be swung forward and its free end will finally move downward on a receding arc, so that said strip will pass over the same, but under the above noted movement, the following action takes place in the cylinder 147, (see Fig. 9). Normally, the full pressure from the rotary pump is exerted on the upper end of a piston 146 and in the air chamber 152 so that, under initial upward movement, the piston 146 displaces the oil from the cylinder, partly by forcing oil into the air chamber 152, but chiefly by forcing the oil back through the port 156 to the pump, where it finds its escape through the valve 139. Because of the inertia and frictional resistance of the oil in the supply conduit, the resistance offered by the arm 31 will be greatest at the beginning of the feed movement, but almost instantly the valve 153 will move upward and completely open the port 156, thereby slightly reducing the pressure. This extreme or greatest pressure at the beginning of the movement of the arm 31 is desirable because it insures positive positioning of the flooring strip at a right angle to the line of feed, before it has been fed onto the knife-edged guide rails, and it is also desirable that this pressure be decreased when the flooring strip has been fed well onto said guide rails, and that this pressure be substantially relieved or broken down before the flooring strip has pressed the free end of the arm 31 below the horizontal plane of the upper edges of the guide rails 18, so as to thereby prevent said arm from being held with much force against the lower edge and under face of the flooring strip.

The latter noted function or pressure-releasing action takes place when the piston 146 is moved high enough to bring its annular groove 161 into registration with the cylinder port 157, which, it will be remembered, is connected to the receiving chamber of the pump. As soon as the flooring strip passes completely over the free end of the arm 31, the light pressure then exerted on the upper end of the piston 146, because of the greater area of the inlet passage 155 over that of the outer passage 163, will impart initial downward movement to the piston 146, and as soon as the annular groove 161 is out of registration with the port 157, the full pump pressure will be exerted to return the piston 146 to its extreme lower position and arm 31 to its normal position. Attention is here called to the facts that when piston 146 is elevated, valve 153 also will be elevated, so that air cushion chamber 152 will then be in communication with both ports 156 and 157, through ports 154, 162, and 163. This causes an equalization of pressures above and below valve 153 so that said valve will lower to position shown in Fig. 9, under the action of gravity. Of course, the difference in pressure due to the difference in area of the above noted passages 155 and 163 may be accomplished in different ways. The air cushion 152 is a desirable but not an essential feature, its function being simply to cushion initial shocks or strains due to sudden movements of the piston. The valve 153 then closes and cuts off supply of oil except through the port 155, thereby causing a slow downward movement of the piston 146.

The pressure that will be maintained on the piston 146, while in its lowered position, may be varied by adjustments of the spring 143, which holds the yielding abutment or choke valve 139, of the pump, normally in closed position.

The first feed movement of the feed bars 53 moves the flooring strip to the positions shown in Fig. 1, past the saw 32, which cuts the flooring strip where desired, and positions said strip just at the left of the grooving saw or end cutter 48. Under the second reciprocation or feed movement, the hooks 53$^b$, of the feed bars 53, engage this flooring strip and move the same past the end cutter 48, which, as illustrated, is a saw that cuts the groove in the end of the strip, but, in other instances, it might be a cutter for forming a tongue on the end of the strip. This second movement of the feed bars also carries the flooring strip off from the sharp edges of the guide rails 18 and into engagement with the hooked lower end of the supporting rod 165, and the latter, as already stated, prevents the strip from sagging until it is clear of the knife edges of the guide rails.

It has already been stated that the primary clutch 81—85 is a one-revolution clutch and the manner in which it is made to so act may now be noted, directing attention particularly to Fig. 3. When the oscillatory arm 63 moves toward the left, in respect to Fig. 1, the arm 65 moves upward, thereby compressing the upper spring 94 and causing the lever 88 to move in a direction to position the beveled cam-acting flange 87 in the path of movement of the notch 86 of the clutch dog 85, so that said cam flange will engage the notch 86 of the clutch dog 85 and retract the latter out of engagement with the tooth clutch hub 81 and automatically stop the arm 63 when it has again reached its so-called normal condition shown in Figs. 1 and 3. As soon as the lever 88 was positioned, as just stated, the spring 99 caused the shoulder 98 of the bell crank 96 to engage the segmental end of said lever and lock the same in the operative position just noted, ready to be again tripped by the pressing of the next flooring strip against the trigger 30.

The manner in which the several safety devices, diagrammatically illustrated in Fig. 14, will energize the common electromagnet 173 to trip the machine out of action, has already been generally described and the manner in which said electromagnet, when energized, will move the valve 120 into the position in Fig. 5, thereby causing hydraulic pressure from the pump to release the secondary clutch, will now be further traced. Obviously, when the valve 120 is in the position shown in Fig. 5, oil from the pressure side of the pump will be admitted through the ports 126 and 127 into the cylinder 115, thereby forcing the piston 114 outward or toward the left, causing the lugs 111 to completely fill the slots 109, displacing the clutch plunger 108 so that the latter will then run freely over the adjacent face of the shaft flange 110 and the flush faces of said lugs. This releases the secondary clutch and stops rotation of the shaft 80 and parts driven therefrom, to wit, the oscillatory arm 63, feed bars 53 and the primary clutch 85—81. Of course, as soon as the circuit to the magnet 173 is again opened by restoring the contact elements of the safety device to normal condition, the valve 120 will be again moved downward by spring 125 and gravity, thereby closing the port inlet 126 and connecting the cylinder to the return pipe 130 through the port 131, and this, of course, permits the spring-pressed clutch plungers 108 to again engage with the slots or seats 109, and thus, again couple the shaft 80 to the constant running gear 76, leaving the machine then again under control of the primary clutch.

Attention may be further called to the fact that, by adjusting the hook rod 165 vertically, it may be set for proper action on flooring strips of different thickness, while, by pivotally adjusting the bracket 167, said hook rod may be set for proper action on flooring strips of different widths.

It has probably already been made clear, but it may be here repeated that, when the table block 19 is vertically adjusted by means of the reverse screw connection 27, (see Fig. 12), then not only will the knife-edged rails 18 be adjusted to set the feed throat for flooring strips of different thickness, but the resisting arm 31 will be correspondingly set. If further adjustment of the arm 31, relative to the rails, is required, this may be done by vertical adjustments of the stop bar 150$^a$, which limits the downward movement of the piston 147, (see Fig. 9). In fact, the free upper end of the arm 31 should have less normal projection above the bottom of a thin flooring strip than it should above the bottom of a thick flooring strip. Also, the feed-resisting force offered by the arm 31 should be less for thin flooring strips than for thick flooring strips, and this may be taken care of by decreasing the tension of the spring 143, which acts to close the choke valve 139, (see Fig. 11).

What I claim is:

1. In a machine of the character described, the combination with a cut-off saw and a cutter, of a feed throat for delivering strips to said saw and from thence to said cutter, an oscillatory power-driven arm, and a pair of rake-acting feed bars pivoted to said arm for independent vertical movements, said feed bars having primary and secondary driving shoulders, the former serving to feed the strips to and past the saw and the latter serving to feed the strips to and past said cutter.

2. In a machine of the character described, the combination with a cutter and a feed throat for delivering strips thereto, of a plurality of rake-acting feed bars, and a vibratory power-driven member to which said feed bars are pivoted for independent vertical movements, said feed throat including an overhead guide and underlying knife-edged rails.

3. In a machine of the character described, the combination with cutter and a feed throat for delivering strips thereto, of a plurality of rake-acting feed bars, and a vibratory power-driven member to which said feed bars are pivoted for independent vertical movements, said feed throat including an overhead guide and underlying knife-edged rails, said rails being vertically adjustable but unyieldingly mounted.

4. In a machine of the character described, the combination with a cutter and a feed passageway for delivering strips thereto, of means for feeding strips through said feed passageway and past said cutter, and a pivoted yieldingly supported hook located at the delivery end of said feed passageway and operative to hold the strip until it has been fed entirely out of said passageway.

5. In a machine of the character described, the combination with a cutter and a feed throat for delivering strips thereto, of means for feeding the strips through said feed throat and past said cutter, said means comprising power-driven transmission mechanism including a one-revolution clutch, means for tripping said clutch into action including a trigger arranged to be engaged by the strip during its initial movement to said feed throat, and a yielding supporting hook located at the delivery end of said feed throat and operative to hold the strip until it has been fed entirely out of said feed throat, said feed throat and said hook being vertically adjustable for strips of different thickness.

6. In a machine of the character described, the combination with a cutter, of a feed passageway for delivering strips thereto, means for feeding the strips through said feed passageway and past said cutter, and a feed resisting device at the receiving end of said feed passageway operative with diminished force as it approaches the point of release.

7. In a machine of the character described, the combination with a cutter, of a feed throat for delivering strips thereto, means for feeding the strips through said feed throat and past said cutter, and a feed-resisting device at the receiving end of said feed throat operative with maximum force to resist initial feed movement of the strip but to release such resisting pressure while the strip is still in contact therewith.

8. In a machine of the character described, the combination with a cutter, of a feed throat for delivering strips thereto, means for feeding the strips through said feed throat and past said cutter, a feed-resisting device at the receiving end of said feed throat operative with maximum force to resist initial feed movement of the strip but to release such resisting pressure while the strip is still in contact therewith, said feed-resisting device comprising a cylinder and piston, and a pump with connections for producing hydraulic pressure in said cylinder.

9. In a machine of the character described, the combination with a cutter, of a feed throat for delivering strips thereto, means for feeding the strips through said feed throat and past said cutter, a feed-resisting device at the receiving end of said feed throat operative with maximum force to resist initial feed movement of the strip but to release such resisting pressure while the strip is still in contact therewith, said feed-resisting means comprising a pivoted arm, the end of which is engageable with the strip, a cylinder, a piston in said cylinder connected to said arm, and a hydraulic pump having delivery and return connections to said cylinder.

10. In a machine of the character described, the combination with a cutter, of a feed throat for delivering strips thereto, means for feeding the strips through said feed throat and past said cutter, a feed-resisting device at the receiving end of said feed throat operative with maximum force to resist initial feed movement of the strip but to release such resisting pressure while the strip is still in contact therewith, said feed-resisting means comprising a pivoted arm, the end of which is engageable with the strip, a cylinder, a piston in said cylinder connected to said arm, and a hydraulic pump having delivery and return connections to said cylinder, said cylinder and pivoted arm being vertically adjustable for action on strips of different thickness, and said feed throat being correspondingly adjustable.

11. In a machine of the character described, the combination with a cutter, of a feed throat for delivering strips thereto, means for feeding the strips through said feed throat and past said cutter, a feed-resisting device at the receiving end of said feed throat operative with maximum force to resist initial feed movement of the strip but to release such resisting pressure while the strip is still in contact therewith, said feed-resisting means comprising a pivoted arm, the end of which is engageable with the strip, a cylinder, a piston in said cylinder connected to said arm, and a hydraulic pump having delivery and return connections to said cylinder, said cylinder and pivoted arm being vertically adjustable for action on strips of different thickness, and said feed throat being correspondingly adjustable, but adjustable independently of said cylinder and arm.

12. In a machine of the character described, the combination with a cutter, of a feed throat for delivering strips thereto, means for feeding the strips through said feed throat and past said cutter, a feed-resisting device at the receiving end of said feed throat operative with maximum force to resist initial feed movement of the strip but to release such resisting pressure while the strip is still in contact therewith, said feed-resisting means comprising a pivoted arm, the end of which is engageable with the strip, a cylinder, a piston in said cylinder connected to said arm, and a hydraulic pump having delivery and return connections to said cylinder, said pump having a yieldingly closed relief port.

13. In a machine of the character described, the combination with a cutter, of a feed throat for delivering strips thereto, means for feeding the strips through said feed throat and past said cutter, a feed-resisting device at the receiving end of said feed throat operative with maximum force to resist initial feed movement of the strip but to release such resisting pressure while the strip is still in contact therewith, said feed-resisting means comprising a pivoted arm, the end of which is engageable with the strip, a cylinder, a piston in said cylinder connected to said arm, and a hydraulic pump having delivery and return connections to said cylinder, said pump having a relief port and a co-operating relief valve normally closing said relief port, and an adjustable device normally closing said relief valve.

14. In a machine of the character described, the combination with a cutter, and means for feeding strips thereto, of a feed-resisting device comprising a depressible resisting element, a cylinder, a piston working in said cylinder and connected to said depressible element, and means for producing hydraulic pressure in said cylinder and for relieving the pressure after it has exerted a maximum resistance during the initial feeding action.

15. In a machine of the character described, the combination with a cutter and means for feeding strips thereto, of a feed-resisting device comprising a depressible resisting element, a cylinder, a piston working in said cylinder and connected to said depressible element, said cylinder having inlet and outlet ports, the latter of which is normally closed by said piston but is arranged to be opened by movements of said piston, and a hydraulic rotary pump having connections to the inlet and outlet ports of said cylinder and having a yieldingly closed by-passage for relieving the pressure produced by the pump and determining the pressure exerted in said cylinder.

16. In a machine of the character described, the combination with a cutter and means for feeding strips thereto, of a feed-resisting device comprising a depressible resisting element, a cylinder, a piston working in said cylinder and connected to said depressible element, said cylinder having inlet and outlet ports, the latter of which is normally closed by said piston but is arranged to be opened by movements of said piston, and a hydraulic rotary pump having connections to the inlet and outlet ports of said cylinder and having a yieldingly closed by-passage for relieving the pressure produced by the pump and determine the pressure exerted in said cylinder, said cylinder further having a yielding valve that normally permits an obstructed flow between said cylinder and its inlet port, but is movable under sudden pressure to produce an unobstructed or freer flow.

17. In a machine of the character described, the combination with a cut-off saw, and a cutter, of a feed throat for delivering strips to said saw and from thence to said cutter, a plurality of rake-acting feed bars, and a vibratory power-driven member to which said feed bars are pivoted for independent vertical movements.

18. In a machine of the character described, the combination with a cutter and a feed throat for delivering strips thereto, of a pair of rake-acting feed bars mounted for independent vertical movements and having driving shoulders and cam surfaces, the former for positively feeding the strips and the latter for action on the strips to raise the bar and position said shoulders for feeding action on the strip.

19. In a machine of the character described, the combination with a cutter and a feed passageway for delivering strips thereto, or rake-acting feed bars mounted for independent vertical movement, means for simultaneously imparting operative feed movements to said bars, said feed bars each having rigid thereon primary and secondary driving shoulders, a cam surface between said shoulders, and a cam surface at its free end beyond said primary shoulder, said cam surface being operative on the strips to carry said shoulders over the strips and into position for feeding actions thereon.

20. In a machine of the character described, the combination with a cutter and a feed throat for delivering strips thereto, of a pair of rake-acting feed bars provided with driving shoulders, and a vibratory driving element to which said feed bars are connected, said feed bars being independently adjustable longitudinally to properly align or position their driving shoulders for action on the strips.

21. In a machine of the character described, the combination with a cutter and a feed throat for delivering strips thereto, of a pair of rake-acting feed bars provided with driving shoulders, and a vibratory driving element to which said feed bars are connected, said feed bars being independently adjustable longitudinally to properly align or position their driving shoulders for action on the strips, said feed bars being capable of independent vertical movements.

22. In a machine of the character described, the combination with a cutter and a feed passageway for delivering strips thereto, of means for feeding the strips through said passageway, and a feed resistance device arranged to travel with the work and operating with a diminished force as it approaches the point of release.

23. The structure defined in claim 22, in further combination with means for removing said resistance device from the path of the work after it has performed its resisting function.

24. The structure defined in claim 22 in which said resistance device involves a pivoted arm, the free end of which moves on the arc of a circle and passes outward of the path of the work after it has performed its resisting function.

25. The structure defined in claim 22 in further combination with means for turning said resistance device to its normal position.

26. The structure defined in claim 22 in further combination with means for adjusting the work-engaging portion of said resistance device.

27. The structure defined in claim 22 in which said passageway and resistance device are mounted for simultaneous adjustments.

28. The structure defined in claim 22 in further combination with adjustable means for varying the forward normal position of said resistance device.

29. The structure defined in claim 22 in further combination with means for varying the resisting action of said resistance device.

30. In a machine of the kind described a variable resistance device, operative to resist the advance movement of the work with a decreasing force.

31. In a machine through which strips are fed laterally, resisting means for resisting advance movement of the strips, and strip-feeding means operative on the strips at points on each side of said resisting means.

32. In a machine through which strips are fed laterally, laterally spaced pairs of upper and lower strip-guiding members, and strip-feeding means and feed-resisting means operative on these strips at points between said pairs of guiding members.

33. In a machine through which strips are fed laterally, laterally spaced pairs of upper and lower strip-guiding members, strip-feeding means and feed-resisting means operative on these strips at points between said pairs of guiding members, and cutting means outside of the space between said pairs of guiding members.

34. In a machine through which strips are fed laterally, laterally spaced pairs of upper and lower strip-guiding members, strip-feeding means and feed-resisting means operative on these strips at points between said pairs of guiding members, and a saw and a cutter both located outside of the space between said pairs of guiding members, the one in advance of the other.

35. In a machine of the character described, the combination with upper and lower strip-guiding members, of means for quickly moving one of said strip-guiding members toward and from the other to release a strip or restore the member for strip-guiding action, and without disturbing the predetermined working adjustment of the parts.

36. A machine of the character described comprising a cutter, a feed throat and co-operating means for delivering strips to said cutter, said feed throat including an overhead guide and underlying knife-edged guide rails, one class of said guide members being adjustable toward and from the other, and means for quickly moving one class of strip-guiding members toward and from the other to release a strip or to restore the members for strip-guiding action and without disturbing the predetermined working adjustments of the parts.

In testimony whereof I affix my signature.

WILLIS S. SHERMAN.